United States Patent [19]

Sabin

[11] Patent Number: 5,210,603
[45] Date of Patent: May 11, 1993

[54] AUTOMATED VIDEO RECORDING DEVICE FOR RECORDING A GOLF SWING

[76] Inventor: Donald C. Sabin, 1255 Van Buren St., Hollywood, Fla. 33019

[21] Appl. No.: 824,237

[22] Filed: Jan. 21, 1992

[51] Int. Cl.$^5$ .............................................. H04N 7/18
[52] U.S. Cl. ..................... 358/93; 358/254; 358/335; 434/252
[58] Field of Search ................ 358/93, 108, 254, 335; 434/252

[56] References Cited

U.S. PATENT DOCUMENTS

| | | | |
|---|---|---|---|
| 3,408,750 | 11/1968 | McCollough | 434/252 |
| 3,820,133 | 6/1974 | Adorney | 434/252 |
| 4,005,261 | 1/1977 | Sato | 358/93 |
| 4,163,941 | 8/1979 | Linn | 358/22 |
| 4,713,686 | 12/1987 | Ozaki | 358/93 |
| 4,719,513 | 1/1988 | Peterson | 358/254 |
| 4,755,881 | 7/1988 | Bartlett | 358/254 |
| 4,864,410 | 9/1989 | Andrews | 358/93 |
| 5,082,281 | 1/1992 | Berghofer | 434/252 |
| 5,091,791 | 2/1992 | Mitchell | 358/254 |
| 5,111,410 | 5/1992 | Nakayama | 358/105 |

Primary Examiner—Howard W. Britton
Attorney, Agent, or Firm—Malin, Haley, DiMaggio & Crosby

[57] ABSTRACT

A portable battery-operated video camera and recorder system that includes illuminated messages and time displays for automated use to allow one to make a video recording of a golf swing or similar activity. The system is weatherproof and completely automated with a vending machine that provides for a predetermined amount of recording time. The video camera lens is mounted strategically and sized to provide the best optical view of a golf swing at a predetermined distance from the golf swing tee-off mat.

6 Claims, 7 Drawing Sheets

AUTOMATED VIDEO RECORDING DEVICE FOR RECORDING A GOLF SWING

BACKGROUND OF THE INVENTION

1. Field of the Invention

This invention relates generally to an automated, portable, vended video camera and recorder system for recording a golf swing, baseball swing, or similar activity, and specifically to a portable vended, automated video camera and recorder system that can be used typically at a golf driving range for recording a golf swing. The device includes a battery powered electronic control system having a microprocessor that provides sequential operation to a video camera, a VCR (video cassette recorder), the vending equipment to validate payment, and provides for an LED time display and message center in a portable waterproof housing. The message center gives operational instructions to the user for automated use.

2. Description of the Prior Art

Mastering the perfect golf swing has long been an objective of all golfers. The use of modern day equipment such as video cameras and recorders can be used to provide a visual picture of a player's golf swing for analysis based on the player watching his or her own swing recorded that can be reviewed over and over on a recorded video tape. Heretofore, video systems shown for recording a golf swing have been somewhat impractical; in particular, purchasing a complete system of a video camera and VCR recorder just for recording a golf swing would be quite expensive to an individual golfer. Use outdoors would also be impractical and could damage conventional video systems. In order to establish a low cost, high quality recording system, the present invention provides a vended system especially for outdoor usage such that an individual golfer can go to a driving range, and for a few dollars can video record several minutes and numerous golf swings by placing money in the vending apparatus to get a predetermined number of minutes of video recording of the golfer's swing.

The invention is especially suited for driving ranges and the like in that it is portable, uses battery power so that it can be wheeled conveniently out to the mat areas where the golf tees are located, and can be conveniently positioned at any desired location around the golf tee mats so that different views of each golf swing can be recorded. The present invention is automated and vended with complete instructions to the user provided by a visually displayed message center.

The prior art shows a compact video system shown in U.S. Pat. No. 4,719,513 issued to Peterson on Jan. 12, 1988 that has a collapsible cart housing and a screen for shielding the video monitor from bright sunlight. U.S. Pat. No. 4,755,881 issued to Bartlett on Jul. 5, 1988 shows a transportable video apparatus that can be used outdoors, but does not have the desirable results that can be obtained by applicant's invention.

BRIEF SUMMARY OF THE INVENTION

A portable, automated video camera and recorder system for video recording of a golf swing through a vended apparatus. The portable device includes a weatherproof housing that contains a video camera, a VCR (video cassette recorder), a portable power supply such as a battery, a transformer (DC to AC), vending apparatus for receiving paper money (bills such as $5, $10, or $20 denominations, for example), and an electronic control system that includes a microprocessor that sequentially operates the system, the actuation of the video camera in conjunction with an LED time display to show the golfer the preparation and ready time prior to the camera being turned on, the play time while the camera is operating, and a visual message center display to describe to the user the system actuation instructions.

The system is mounted in a rigid, rectangular, vertically elongated housing having a pair of wheels, one attached on each side. The wheels allow the housing to be moved typically from a pro shop out to the golf tee mat areas at a conventional driving range or golf course driving range.

The housing includes a front display panel along one vertical side face that includes weather sealed openings for displaying a video monitor, a window for directing the video camera contained in the housing, a paper money vending apparatus for receiving and recognizing paper money, a visual timer display face, and a visual message display, and an opening for inserting and ejecting a video cassette, which can include a lockable cover to prevent moisture or vandalism.

The housing which may be made of fiberglass or heavy duty plastic or metal also includes one or more openings that act as vents to ventilate battery vapors or heat build-up within the device in conjunction with internal fans.

Inside the housing are contained a plurality of rigid, horizontal planar surfaces mounted to the housing as racks from side to side firmly and rigidly within the housing to support the video monitor, the VCR, vending equipment, the electronic circuitry, the transformer, and the batteries which are mounted in the bottom for ensuring vertical stability by having the heavy weight of the batteries in the base of the unit. A battery charger may be included.

Six or twelve volt batteries may be employed, one or two as required, along with a conventional AC/DC battery charger that can be plugged into a conventional outlet when desired for recharging the batteries. The batteries are typically mounted on a rack near the floor or on the floor itself of the housing. The housing also includes extended front leg stands for stability. The device may include wheel locks so that it can be positioned where desired without undesirable movement. A self-contained distance measuring device is attached to the housing for prepositioning the system the correct distance from the tee for a visually perfect-recorded picture of a golf swing.

Of particular interest with this device is the unique display face used in conjunction with the vending apparatus for receiving paper money that provides sequential operation information (prompts) and time information to the observer standing opposite the front face of the displays for automated operation. The device does not require an attendant for its operation.

In its normal operation, the entire housing would be movably positioned to an area adjacent the golf tee mat so that the desired angle of the person's golf drive can be observed by facing the front display face towards that portion of the golfer to observe the desired angle relative to the golfer's swing. The distance measuring device provides the correct lens distance. The video camera is aligned optically with a clear window on the display face and can be used with a wide angle lens of predetermined size in conjunction with either predetermined marks on the ground or use of the self-contained distance marker to obtain the correct location relative to the golf tee mat at all times. An LCD visual display message center conveniently positioned at the top of the housing display face provides an optimum visual view for step-by-step instructions to use the device. An LED visual display shows start time and time remaining during the recording period.

The housing also includes an aperture with sealing gasket that receives on the display face side a video monitor screen which allows the golfer to visually acknowledge the operation of the system prior to and during recording. (The system may include other actuating control buttons if necessary that would adjust record time or control the machine as desired.)

In a typical operation of the system, after the housing has been properly positioned for video recording relative to the golf tee mat, the automated sequence begins when the golfer inserts paper money into the vending receiving slot, which turns on the power and unlocks the VCR cassette door slot, allowing a VCR cassette to be inserted into the VCR. The golfer would bring his own cassette or purchase one at the pro shop. After the cassette is inserted, the video camera and monitor will activate, allowing the user a predetermined time period (30 seconds) to get properly positioned on the tee for video recording. After that period to set up, video recording would begin. At this time, the LED time display and LCD message center would be illuminated to provide a message to the golfer as to the set-up time and the time remaining during the recording session. The system can be set for a predetermined amount of time, such as 5 or 10 minutes, during which time the golfer then can make a series of different tee shots, depending on the amount of money paid for a predetermined amount of time. The video message center will then relay when the recording session has ended, as will the time display. A warning device may be provided that will alert the golfer when only 1 or 2 minutes are left if the golfer wishes to insert additional monies for a continued recording session. After completion of recording, the control system will rewind and play back on the monitor the last 15 seconds of recording to insure the user of a successful recording.

Using the microprocessor and control system in accordance with the present invention, the microprocessor is connected into the vending system for a pay validator, which includes an ON/OFF switch for turning the video camera on and off in its recording sequence and ON/OFF sequencing for the video monitor and the VCR in conjunction with the illumination of the proper prompt information for the LCD display message center and the LED time display.

The use of the rigid housing with sealed gaskets around openings and louvered vents prevents any of the electrical equipment inside from becoming wet or moisture ladened because of its rainproof, weather-proof characteristics. With the wheels attached to the housing, the device can be conveniently moved to the desired areas at a golf driving range while being stored indoors at night. The housing would also include access doors with locks so that the monies can be daily removed from the housing; another door provides access to the batteries and battery charger cords for recharging the batteries when desired.

It is an object of this invention to provide an improved golf swing recording system that is actuated with a vended mechanism for use at a driving range or the like.

It is another object of this invention to provide an improved portable, automated video camera and recorder system for the low cost video recording of a golf swing on a video cassette tape that can be actuated by insertion of money for a predetermined period of time, with the system having video LCD and LED message prompts and time displays for the convenience of the user and automated use.

In accordance with these and other objects which will become apparent hereinafter, the instant invention will now be described with particular reference to the accompanying drawings.

PREFERRED EMBODIMENT OF THE INVENTION

Figure 1:
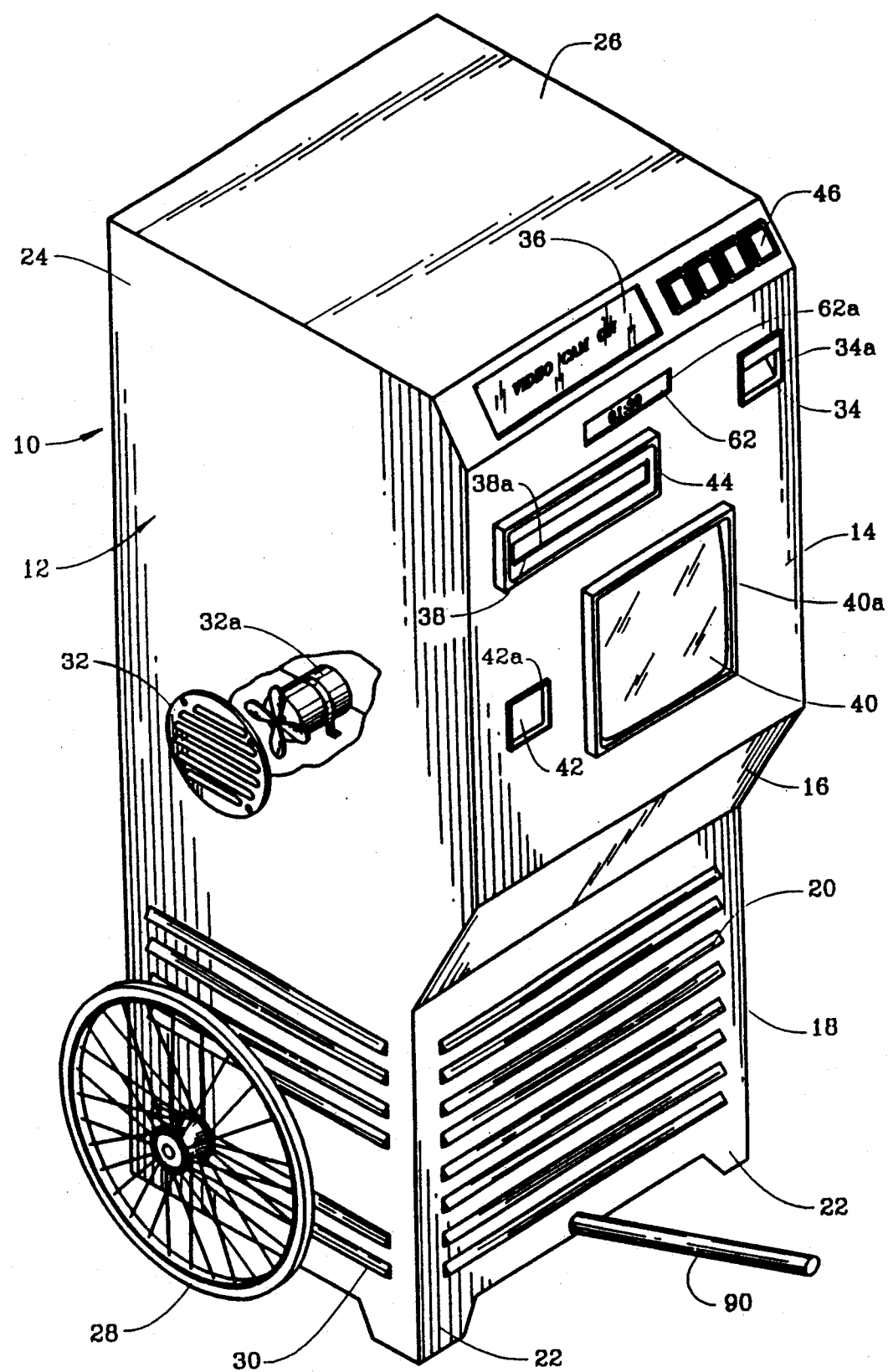
FIG. 1 shows a perspective view of the present invention.

Referring now to the drawings, and in particular FIG. 1, the present invention is shown generally at 10 comprised of a rigid metal, plastic or fiberglass housing 12 that is basically elongated in height and rectangular overall, that includes a front display wall 14 attached to the top surface 26 and side wall 24 and angled front wall 16 and vertical wall 18, all of which are connected together to form a rainproof and waterproof cabinet with back and opposite side walls (not shown). The front vertical wall 18 includes a plurality of covered louvres 20 which allow for air circulation in a downward direction. The front vertical wall 18 also includes a pedestals or foot supports 22.

Mounted in wall 24, a circular aperture includes a louvered opening screen 32 that allows air to flow from within the housing for cooling purposes by the actions of fan 32a to protect the equipment contained therein. The opening 32 is such that, in conjunction with the louvred openings 30, rain cannot penetrate the housing preventing damage to the equipment contained in the housing.

The front display vertical face 14 which extends outwardly somewhat from the vertical wall 18 includes a number of very important components of the invention. Centered in the middle of wall 14 is a TV monitor 40 which is mounted through an aperture in wall 14 with sealed gasket 40a to prevent moisture and is supported on a shelf on the inside of the housing. The TV monitor 40 is utilized in conjunction with the VCR 38 to allow the user to see the video tape output visually from a video camera mounted inside the housing that is optically aligned and directed through clear window 42 mounted across an aperture in wall 14 with gasket 42a.

The entire unit is portable and includes a vending mechanism so that the device cannot operate without receiving paper money in a vending slot 34 that receives $5, $10, or $20 dollar bills to activate the entire system. The specific electrically operated vending paper money receiver and system incorporated in the device is conventional except for its connection and activation into the entire microprocessor control system of the device and includes sealing gasket 34a. Vertical wall 14 also includes a visual display 62 with gasket seal 62a that shows an LED time display which is used in conjunction with the device to inform the user as to important time periods the camera is on and the remaining time left for the video recording process.

The VCR 38 is the unit that receives a standard size VCR cassette tape and may include a solenoid actuated, pin locked door at 38a that can be opened only after payment of the proper amount he vending mechanism. Thus, door 38a reduces vandalism and moisture intrusion by only being able to be opened after payment of the proper amount in the vending mechanism. Furthermore, as door 38a remains tightly closed, except for inserting or rejecting a video cassette tape, it is seen that the video cassette recorder 38 is mounted in a weatherproof manner within housing 12.

Near the top of vertical wall 14 is another visual display 36 message center that can be driven by LCDs that includes instructions for the user as to the sequence of events for the operation and use of the device. Although the system is fully automated, a plurality of manual control buttons 46 may be utilized for the sequential operation of the device if necessary. A measuring tape 90 is attached to the display face side wall 18 for positioning the device relative to a golf tee.

Figure 2:
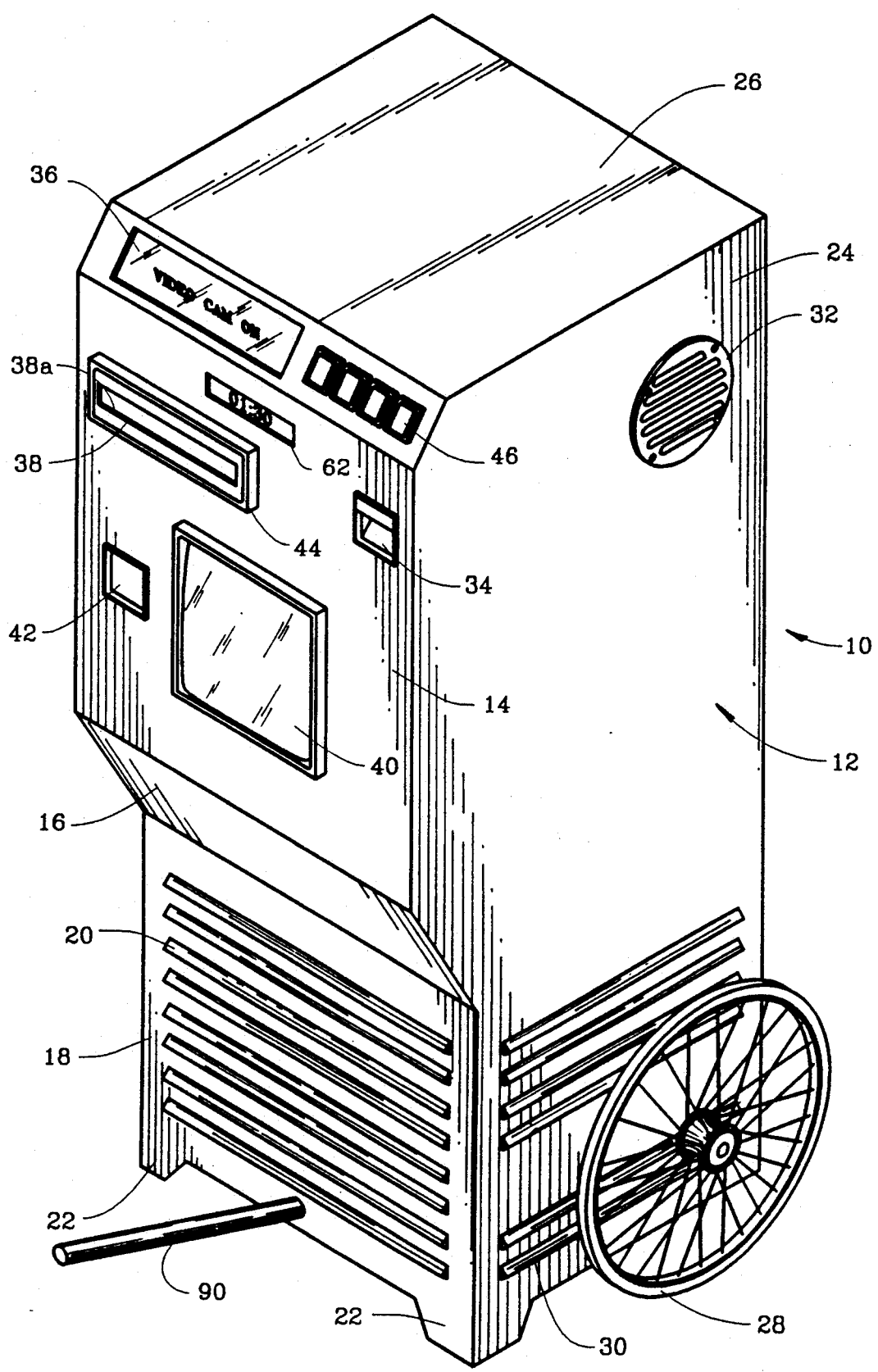
FIG. 2 shows an opposite side perspective view of the invention.

Referring now to FIG. 2, the opposite side wall 48 is shown, which is also a rigid vertical wall that includes air transmitting louvres 50 that allow air to flow through from inside the housing. A wheel is mounted rotatably on an axle 28. The vertical rigid wall 48 also includes a louvered downwardly screen 52 to allow air flow into the housing and out of the housing with a fan inside.

Figure 3:
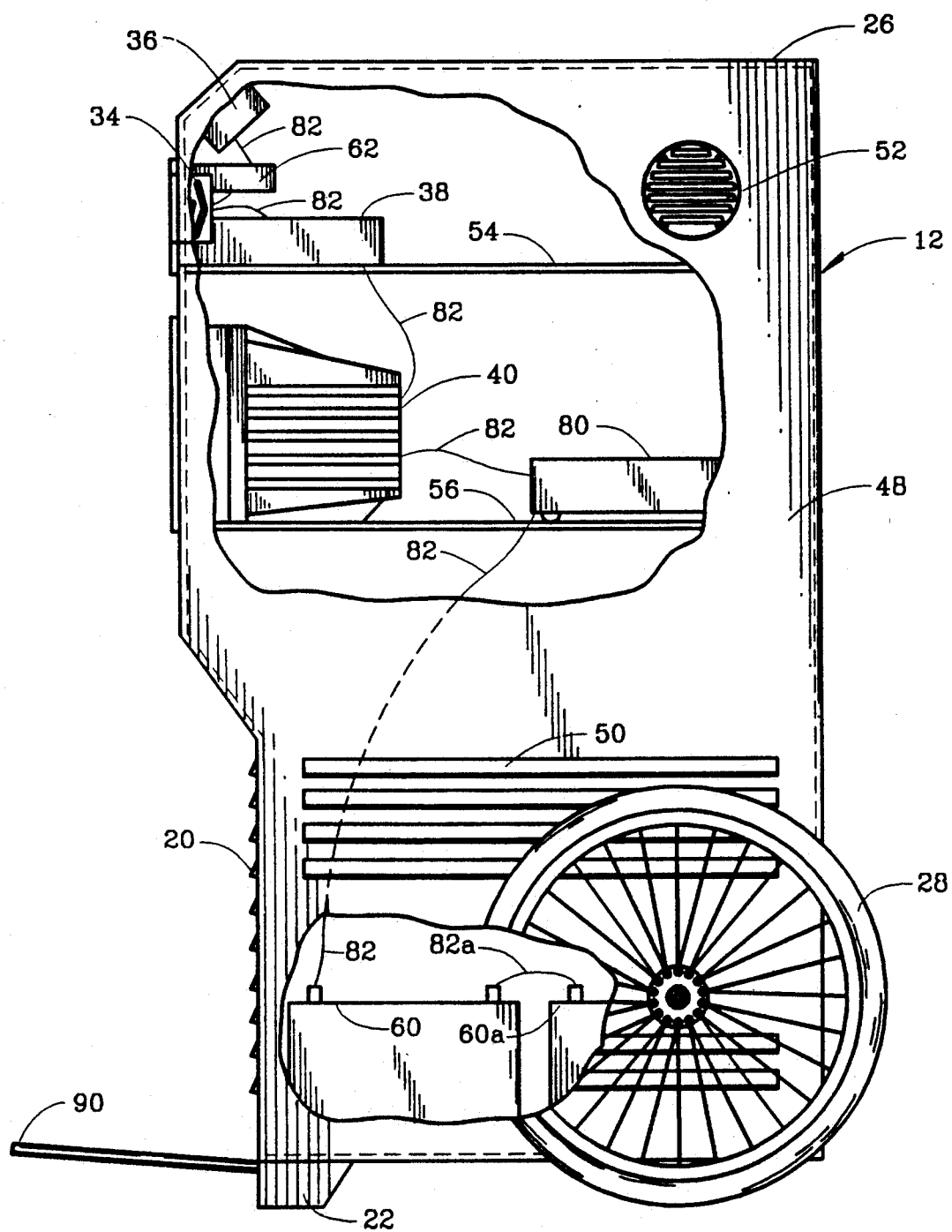
FIG. 3 shows a side elevational view partially cut away at the top and bottom of the present invention.
Figure 4:
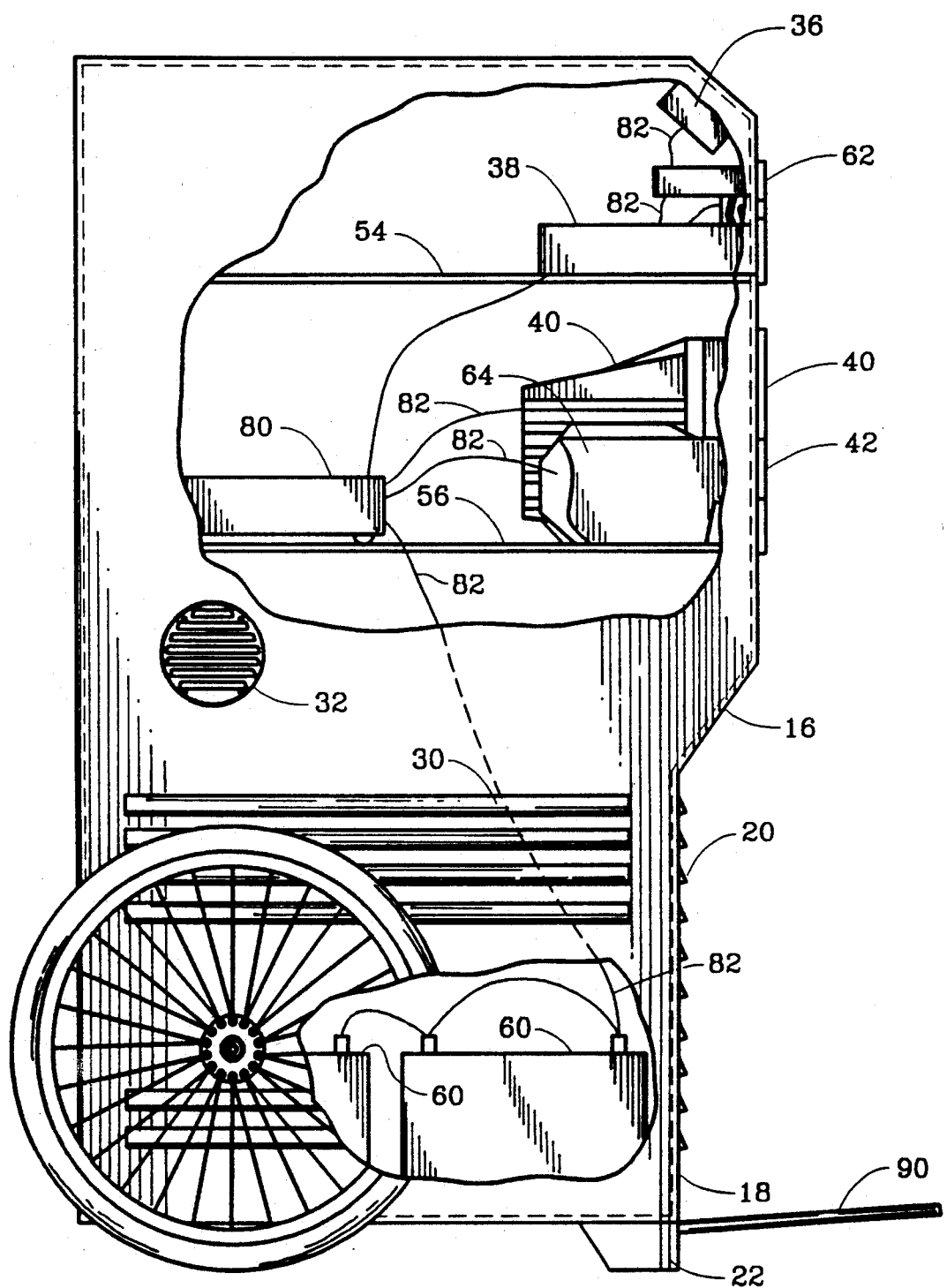
FIG. 4 shows a side elevational view from the opposite side showing a partially cut away top and bottom of the invention.

FIGS. 3 and 4 show the internal housing of the device, including a pair of shelves 54 and 56 which are rigid and extend across the housing to support the various essential components shown in the device. In particular, shelf 56 is used to support the TV monitor 40 and box 80 containing the microprocessor and electronic control circuits, transformer and DC to AC convertor while shelf 54 is used to house and support the VCR 38.

Also shown in the upper housing are the sub-component housing for the LCD message center dispensing 36, which is the visual display mounted across the top of the device at the corner, and the timer display 62 mounted through the front wall. Also shown is the vending mechanism 34, schematically represented. All of the components are electrically connected represented by wires 82.

Of importance, in the very bottom of the housing supported on the floor of the housing are one or two batteries 60 which, because of their weight, are mounted in the base to provide stability to the overall housing. This helps to offset any center of gravity problems because of the weight of the TV monitor 40 so that the device will not be vertically unstable or prone to fall over. Also in the bottom of the housing, there may be a conventional AC/DC battery charger which can be plugged into a circuit or conventional outlet, the battery charger 60a being able to charge the battery 60, preferably during non-operating hours such as at night.

Element 80 represents an upper panel that includes all the control circuitry and microprocessor and other electrical components necessary to properly drive the entire device in an automated fashion, which is explained in greater detail below.

The monitor 40 may typically be a 13" color TV set with a preset adjustment.

The message center 36 which is a liquid crystal display that provides status, prompts and step-by-step instructions to the user as to operation and use of the device for the proper operation of the device. Likewise, the light-emitting diode clock and time display 62 are essential to act as a countdown and optionally flashing system to allow the user to know how much time is remaining on the recording cycle.

Figure 5:
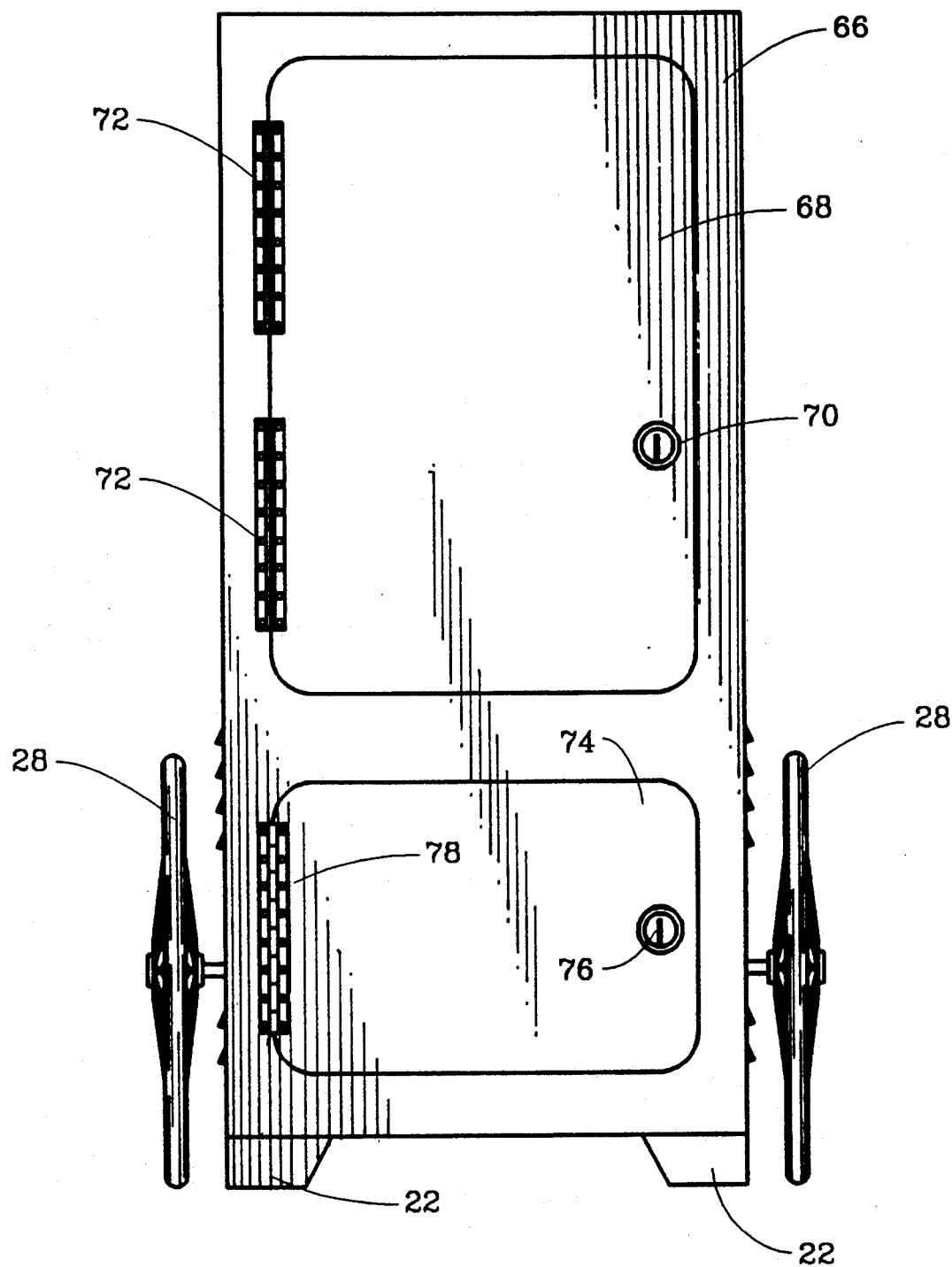
FIG. 5 shows a rear elevational view of the invention and the cabinet housing doors.

As shown in FIGS. 1–5, the housing wall structure could be basically made of a molded fiberglass with a steel frame having back door access as shown in FIG. 5. Essentially, there are two access doors 68 and 74 on the rear of the housing mounted on a vertical rear wall 66 with hinges 72 and 78, respectively. Each door opens separately and provides separate access separate interior compartments. Door 68 provides access to the upper portion which would be for the operating equipment, a key activated lock 70 is necessary since monies can be gotten from the vending apparatus through door 68.

The lower panel door 74, with the aid of lock 76, is for accessing the battery and the battery charging apparatus only.

FIG. 4 shows, mounted on rigid platform shelves 56, a video camera 64 having its optical outside lens facing and mounted to window 42. The system features video camera 64 with a wide angle lens (6 mm) to allow for the proper size picture and access to the proper size golf swing visually. The housing apertures include gaskets where necessary to prevent moisture from getting into any of the electrical equipment around any of the wall openings. The system may include one or more fans 32a to force air outwardly through the air vents 32 and 52 to prevent heat build up or to remove battery fumes. The device will also include a flexible tape 90 in FIG. 4 that can be attached to the display face side to measure the distance (10 to 14 feet) for the optimum positioning of the entire system relative to the golf tee mat. Going back to FIGS. 1 and 2, to operate the invention, the user would insert a $5, $10, or $20 bill into the vending bill receiving apparatus 34 in the front of the device. The pay validator actuates the system through the battery powered control circuit described below, turning on the visual display 36, which prompts to insert a cassette and simultaneously activating a solenoid-pin to open front door 38a to permit insertion of the video tape cassette. A 30 second delay allows the tape to be inserted or money is returned. Cassette insert turns on the video camera and monitor actuating system. After the tape is inserted, the camera and monitor are activated and an additional 30-second delay is provided to allow the user to get into position relative to the camera. Once recording begins, there is a countdown on the time display 62 which, at some point, will start flashing or provide other indications in the message center of a minimal amount of time, such as 30 seconds remaining for recording. This would allow the user to insert additional monies to continue and increase the recording time.

After the final time out, the tape rewinds and plays the last 15 seconds which is visible on the monitor to insure proper operation. The tape is then automatically ejected so that the user can remove and retain the tape.

Note that the video camera is protected by a clear plexiglass shield mounted with the gasket in front facing indicated at 42a. The camera utilizes a wide angle lens preadjusted for a proper image size at a predetermined distance from the device to display the entire golf swing.

Figure 6:
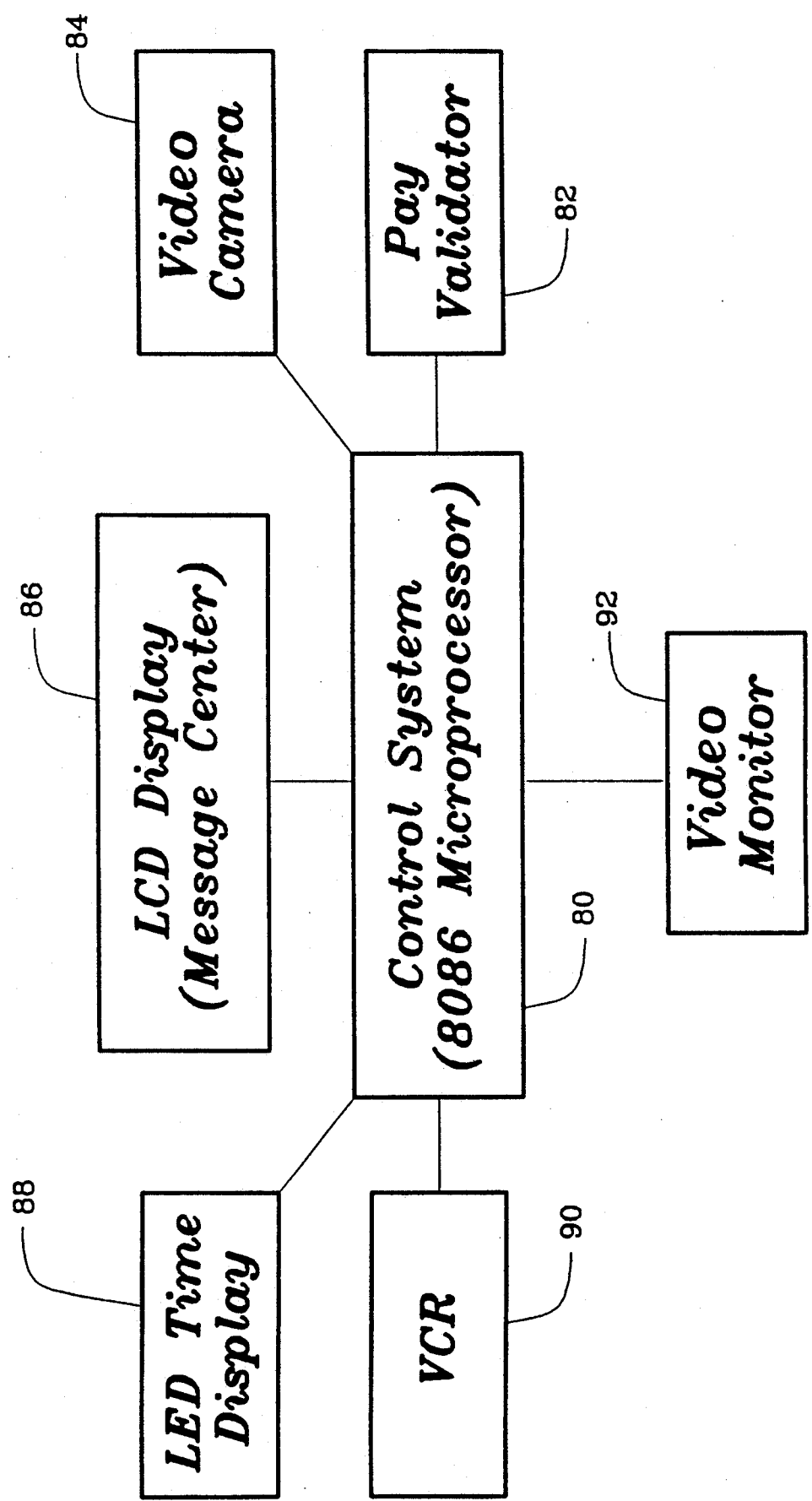
FIG. 6 shows a block diagram of the electronic control components.

Referring now to FIG. 6, the automated electronic system used for the invention is shown, controlled basically by an 8086 microprocessor at the heart of the system. Each of the important and critical electrical units are connected through the electrical control system 80 including the vending apparatus. The vending mechanism represented at 82 provides a signal to the control system once the paper bill insertion and recognition has been validated, turning on the entire system. The control system would then in turn send out the appropriate signals to the LCD display 86, the LED time display 88, turning on the VCR 90 and opening the door 38a, the video camera 84, and the video monitor 92. The control system will then provide all the timing signals and other actuating signals necessary to sequentially operate the device, including the rewind, replay and ejection of the cassette from the VCR at the appropriate moment. As explained before, typically once the money is inserted, initiating the vending apparatus, the message center will provide prompts and instructions to the user to instruct the user of a 30 second time period in which to insert a video cassette in the VCR which, once inserted, starts another timing process with a message telling the user of a 30 to 60-second countdown to recording time. The control system 80 then, at the appropriate time, turns the video camera on while displaying the picture on the video monitor. Again, the control system 80 provides, through the LCD display, additional messages and the countdown time while recording is taking place. With use of the control system, the entire operation of the device is essentially automated and completely user-friendly because of the message center LCD display and the LED time display.

Figure 7:
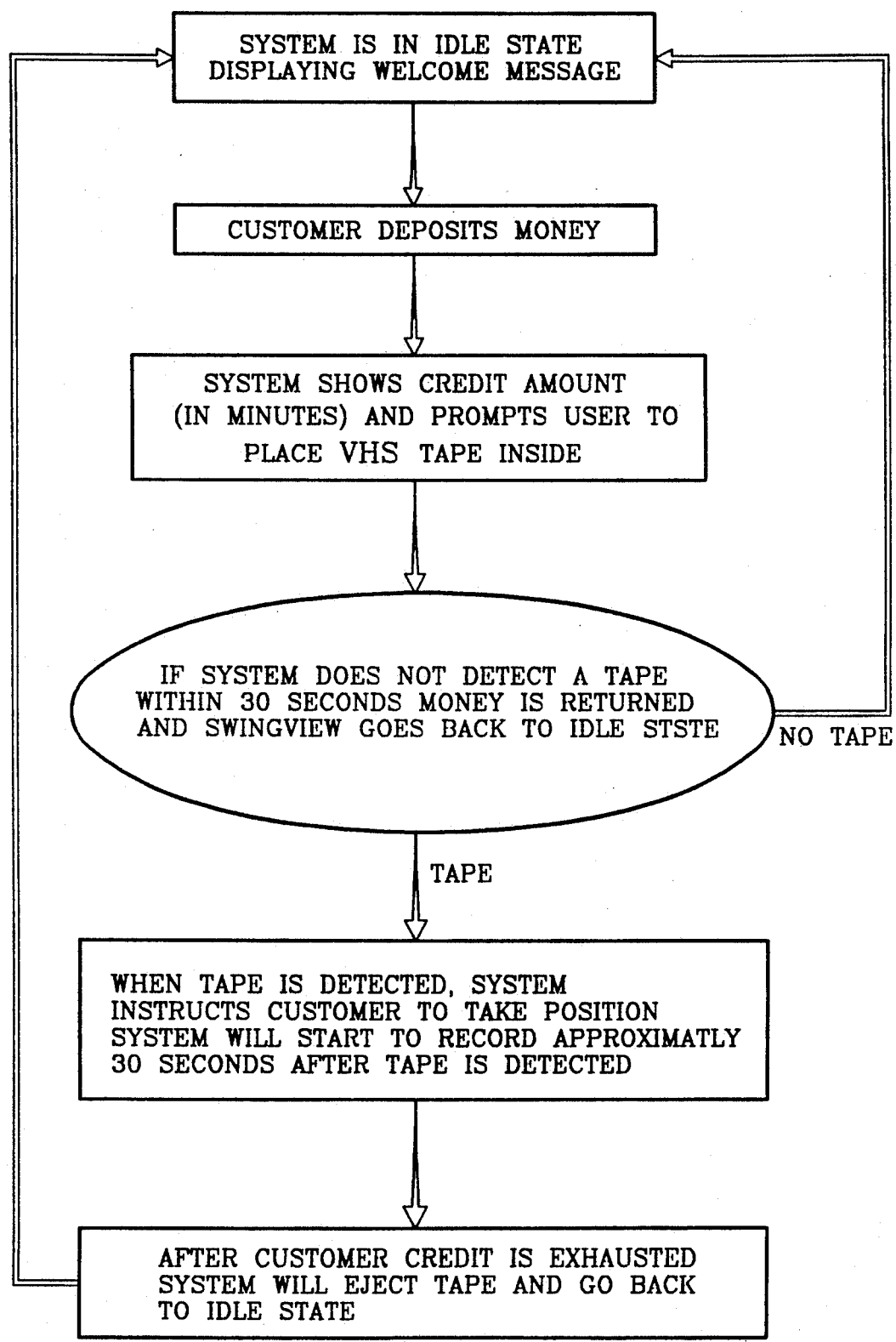
FIG. 7 shows a flow chart depicting operations of the invention.

FIG. 7 shows a general flow chart of the actuation of the device as follows. At first in the idle state, it displays a welcome message. After the customer deposits money, the device shows credit amount in minutes and prompts the user to place a VHS tape inside. If the tape is not detected within 30 seconds, money is returned and the device goes back to the idle state. When the tape is detected, the device will instruct the customer to take position and that it will start to record approximately 30 seconds after the tape is detected. After customer credit is exhausted, the device will eject the tape or in another embodiment rewind the tape, replay the last 15 seconds and then eject the tape and then go back to the idle state.

With the use of the present invention at a driving range, typically each device may be stored indoors and conveniently wheeled out to a location adjacent the golf tee mats for use. The user would then initiate use of the device by inserting monies into the vending apparatus, and follow the instructions on the message center. If the batteries need recharging, the person maintaining the device can plug in the battery charger when necessary.

The use of the present invention can allow one to economically record and observe ones golf swing repeatedly for self-improvement.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A portable vended video camera and recording system for recording a golf swing or similar activity comprising:

a rigid weather resistant housing;

a video camera mounted within said housing, said camera having a lens facing outward from said housing, said camera optically aligned and directed through a clear window disposed along the front wall of said housing;

a video cassette recorder mounted in said housing, having a cassette access mounted through the front wall of said housing near said camera outlet;

a TV monitor mounted in said housing and having a display screen visually mounted and vertically disposed through the front wall of said housing;

a money vending machine mounted inside said housing;

a first prompt message center LCD display device mounted in said front wall of said housing;

an LED time display having a visual display on said first wall housing; and a microprocessor control circuit connected to said vending apparatus, said video camera, said video monitor, said VCR, said LED time display, and said LCD message center display for controlling sequential operation of said system whereby the user can, through the insertion of paper money, record on a video cassette a golf swing for a predetermined time period.

2. A portable vended system as in claim 1, including a pair of wheels mounted notably to said housing.

3. A portable video camera and recording device for recording a golf swing or similar activity, typically in an area near the golf mat tee at a golf driving range, comprising:

a substantially rigid, water resistant, rectangular housing having four flat planar sides with opposite parallel sides and a flat top surface joined together;

first and second shelves mounted inside of said waterproof housing;

at least one door for accessing the inside of said housing;

a television monitor mounted on one of said shelves, one of said vertical flat surfaces of said housing having an aperture therethrough for mounting said television housing, a water resistant gasket disposed around said television display face of said television monitor, said television display face disposed vertically through a first of the four flat planar sides of said housing;

a video camera mounted on one of said shelves, said video camera having a wide angle viewing lens, said camera optically aligned and directed through a clear window disposed along said first planar side of said housing;

a transparent window mounted on a vertical flat surface of said housing through an aperture that includes a gasket mounted around said window and said window being positioned near said shelf so that the wide angle lens of said video camera is directed out through said window, said video camera window being strategically located relative to the height of said housing surface to provide the proper wide angle viewing to achieve a video picture of said golf swing at a predetermined distance;

one or more batteries for a power source, mounted in the base of said housing;

a visual display mounted near the top of said housing, said display having a means for producing alphanumeric characters for visual transmission from said display;

a microprocessor control means connected to said power source, said video camera, said TV monitor, and said message display face for controlling the sequential operation of each of these units;

vending apparatus for receiving bills and initiating said control means as a function of the receipt of bills;

a plurality of wheels rotatably connected to said housing to permit the portability of said housing;

means for measuring distance from the front face of said housing having said video camera window to self-locate said housing at the proper distance for a golf swing in accordance with the wide angle lens of said video camera; and a video cassette recording device for recording signals obtained from a video camera connected to said video camera, said video cassette recorder having a cassette receiving chamber, said cassette receiving chamber being affixed to a flat surface of said housing so that a cassette can be inserted or removed from said video cassette recording chamber by the user, said control circuit being connected to said video cassette recorder.

4. A video camera and recording system as in claim 3, said video cassette recorder chamber including a lockable door to prevent access to said video cassette receiving chamber, said locking means connected to said control means and said vending means, whereby said access door to said video cassette chamber is not activated or openable until said vending apparatus is actuated.

5. A video system as in claim 3, including:
VCR cassette receiving chamber door for protecting said VCR, said door having a locking means.

6. A video system as in claim 3, including:
said power source mounted in the bottom of said housing for balance.

* * * * *